US011416057B2

(12) United States Patent
Krasner et al.

(10) Patent No.: US 11,416,057 B2
(45) Date of Patent: Aug. 16, 2022

(54) POWER DISRUPTION DATA PROTECTION

(71) Applicant: EMC IP Holding Company LLC, Hopkinton, MA (US)

(72) Inventors: John Krasner, Coventry, RI (US); Clifford Lim, Hopkinton, MA (US); Sweetesh Singh, Benares (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 1 day.

(21) Appl. No.: 16/939,133

(22) Filed: Jul. 27, 2020

(65) Prior Publication Data
US 2022/0026970 A1 Jan. 27, 2022

(51) Int. Cl.
*G06F 1/30* (2006.01)
*G06F 11/30* (2006.01)
*G06F 1/3296* (2019.01)
*G06F 1/28* (2006.01)

(52) U.S. Cl.
CPC .............. *G06F 1/30* (2013.01); *G06F 1/28* (2013.01); *G06F 1/3296* (2013.01); *G06F 11/3034* (2013.01); *G06F 11/3058* (2013.01)

(58) Field of Classification Search
CPC ... G06F 1/30; G06F 1/28; G06F 11/30; G06F 1/3296
See application file for complete search history.

(56) References Cited

U.S. PATENT DOCUMENTS

| 7,089,435 | B2* | 8/2006 | Kawakubo | G06F 1/30 365/229 |
| 9,715,911 | B2* | 7/2017 | Bartling | G06F 1/3234 |
| 2008/0290733 | A1* | 11/2008 | Takahashi | H02J 9/061 307/66 |
| 2013/0119768 | A1* | 5/2013 | Chang | H02J 1/102 307/66 |
| 2015/0029808 | A1* | 1/2015 | Allison | G11C 5/005 365/227 |
| 2015/0268709 | A1* | 9/2015 | Morning-Smith | G01R 31/64 307/23 |
| 2017/0160789 | A1* | 6/2017 | Hance | G06F 1/3275 |
| 2017/0199692 | A1* | 7/2017 | Nguyen | H02J 9/06 |
| 2019/0384509 | A1* | 12/2019 | Borlick | G06F 3/0656 |
| 2020/0379548 | A1* | 12/2020 | Dupree | G06F 1/305 |
| 2021/0124405 | A1* | 4/2021 | Guyer | G06F 1/3278 |

\* cited by examiner

*Primary Examiner* — Raymond N Phan
(74) *Attorney, Agent, or Firm* — Krishnendu Gupta; Nikhil Patel

(57) ABSTRACT

One or more aspects of the present disclosure relate to data protection techniques in response to power disruptions a power supply from a continuous power source for a storage device can be monitored. A power disruption event interrupting the power supply from the continuous power source can further be identified. In response to detecting an event, a storage system can be switched to a backup power supply, power consumption of one or more components of the storage device can be controlled based on information associated with each component and an amount of power available in the backup power supply. Further, one or more power interruption operations can be performed while the backup power supply includes sufficient power for performing the power interruption operations.

16 Claims, 4 Drawing Sheets

POWER DISRUPTION DATA PROTECTION

BACKGROUND

A data storage system including storage arrays can use multiple drives in a collection to store a huge amount of data. The stored data can be critical to the operations and success of an organization. Accordingly, organizations implement one or more data protection techniques to safeguard important data from corruption, compromise, or loss. Data protection techniques become increasingly important in response to a power outage.

SUMMARY

One or more aspects of the present disclosure relate to data protection techniques in response to power disruptions a power supply from a continuous power source for a storage device can be monitored. A power disruption event interrupting the power supply from the continuous power source can further be identified. In response to detecting an event, a storage system can be switched to a backup power supply, power consumption of one or more components of the storage device can be controlled based on information associated with each component and an amount of power available in the backup power supply. Further, one or more power interruption operations can be performed while the backup power supply includes sufficient power for performing the power interruption operations.

In embodiments, the state of the storage device contemporaneous to the power disruption event can be determined.

In embodiments, a state of the one or more storage device components contemporaneous to the power disruption event.

In embodiments, the power consumption of the one or more storage device components can be controlled based on a priority-based schema.

In embodiments, the power consumption of each storage device component can be controlled by bringing each storage device component from a first energy state to a lower second energy state In embodiments, the priority-based schema can be generated by: determining one or more of a priority of each storage device component a length of time required to bring each storage device component from the first energy state to the lower second energy state and modeling possible states of each component and the storage device during the power disruption event.

In embodiments, the priority of each storage device component can be determined based on at least a quality of work and/or service provided by each component.

In embodiments, a length of time required to performing one or more power reserve operations can be determined based on the state of each component and the storage device during the power disruption event.

In embodiments, a power shedding schedule can be generated based on one or more of the priorities of each storage device component and the determined length of time to performing the one or more power reserve operations, amongst other power reserve parameters.

In embodiments, the power consumption of each storage device component can be controlled based on the priority-based schema and the power shedding schedule.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Experts theorize that businesses are in an "Information Age," where they generate a vast amount of data every second. For example, businesses gather data to understand both their business and customers. For example, data can drive strategic business decisions. Additionally, data can help a business apply marketing techniques that target specific customer segments to yield greater sales. A business can employ, e.g., a storage area network (SAN) to store their data. A SAN is a network of computer systems and storage systems that include storage devices (e.g., disks). The SAN allows client computers to store data on one or more of the systems connected to the network.

A storage system can include the storage devices (e.g., disks and elements), computer systems, and/or appliances. The storage devices can include non-volatile memory and/or volatile memory. Non-volatile memory can store and retain data without power, while volatile memory requires power to store and data. Volatile memory can access, process, and store data much faster than non-volatile memory. As such, organizations implement volatile memory in their storage systems to keep up with the high-paced data requirements of their respective businesses. Given the risk of data loss from volatile memory due to, e.g., a power failure, organizations require data protection tools to safeguard their data in case of a power loss.

One or more aspects of the present disclosure relate to data protection techniques in response to power disruptions. In embodiments, a power supply from a continuous power source for a storage device can be checked. A power disruption event interrupting the power supply from the continuous power source can further be identified. In response to detecting an event, a storage system can be switched to a backup power supply, power consumption of one or more components of the storage device can be controlled based on information associated with each component and an amount of power available in the backup power supply. Further, one or more power interruption operations can be performed while the backup power supply includes sufficient power for performing the power interruption operations.

Figure 1:
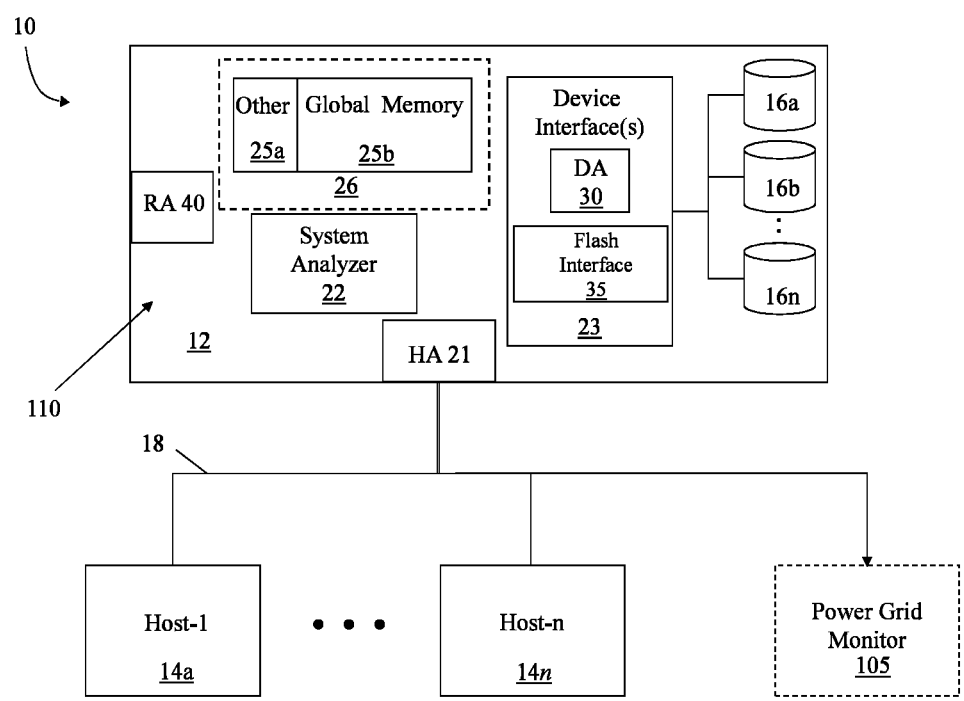
FIG. 1 is a block diagram of a storage system in accordance with example embodiments disclosed herein.

Referring to FIG. 1, an example system 10 includes data storage array 12. The array 12 can communicatively connect to host systems 14*a-n* and power grid monitor 105 through communication medium 18. In embodiments, the hosts 14*a-n* can access the data storage array 12, for example, to perform input/output (I/O) operations or data requests. As described in greater detail below, a power grid monitor 105 can communicatively couple to a power grid delivering power to the storage array 12 from one or more sources. The grid monitor 105 can check power levels from the sources and send update signals to the storage array 12 via medium 18.

The communication medium 18 can be any one or more of a variety of networks or other type of communication connections as known to those skilled in the art. In embodiments, the communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the hosts 14a-n or grid monitor 105 can access and communicate with the data storage array 12. The hosts 14a-n can also communicate with other components included in the system 10 via the communication medium 18.

The hosts 14a-n, data storage array 12, and grid monitor 105 can connect to the communication medium 18 by any one of a variety of connections. The communication medium 18, based on its type, can supply, and support the connection. The hosts 14a-n, array 12, and monitor 105 can include processors, which can be any one of a variety of proprietary or commercially available single or multi-processor system. An example processor can be an Intel-based processor, or other type of commercially available processor able to support traffic based on each embodiment and application.

Each of the hosts 14a-n, grid monitor 105, and data storage array 12 can all be found at the same physical site or can be in different physical locations. Examples of the communication medium 18 that can be used to provide the different types of connections between the host computer systems and the data storage system of the system 10 can use a variety of different communication protocols such as SCSI, Fibre Channel, iSCSI, and the like. Some or all the connections by which the hosts 14a-n, grid monitor 105, and data storage array 12 can be connected to the communication medium can pass through other communication devices, such switching equipment that can exist such as a phone line, a repeater, a multiplexer or even a satellite.

Each of the hosts 14a-n can perform distinct types of data operations. For example, any of the hosts 14a-n can issue a data request to the data storage array 12. In embodiments, the hosts 14a-n can be executing an application that an perform either a read or write operation resulting in one or more data requests to the data storage array 12.

Although array 12 is illustrated as a single data storage array, array 12 can also represent, for example, multiple data storage arrays alone, or in combination with, other data storage systems, systems, appliances, and/or components having suitable connectivity, such as in a SAN. Embodiments can also include data storage arrays or other components from one or more vendors. In embodiments described herein, reference can be made to a single data storage array by a vendor, such as by DELL Technologies of Hopkinton, Mass. However, as is appreciated by those skilled in the art, the disclosed embodiments are applicable for use with other data storage arrays by other vendors and with other components than as described herein for purposes of example.

The data storage array 12 can include a variety of software and hardware elements ("components") 110. In embodiments, the data storage array 12 can include a plurality of data storage disks 16a-n. The data storage disks 16a-n can include one or more data storage types such as, for example, one or more disk drives and/or one or more solid state drives (SSDs). An SSD is a data storage device that uses solid-state memory to store persistent data. An SSD using SRAM or DRAM, rather than flash memory, can be a RAM drive. SSD can refer to solid state electronics devices as distinguished from electromechanical devices, such as hard drives, having moving parts. Flash devices or flash memory based SSDs are one type of SSD that does not have moving parts. In embodiments, one or more of the disks 16a-n can be flash drives or devices. In other embodiments, the disks 16a-n can work with any type of SSD such as a flash device or flash memory device.

The storage array 12 can also include distinct types of adapters or directors, such as a HA 21 (host adapter), RA 40 (remote adapter), and/or device interface 23. Each of the adapters HA 21, RA 40 can include hardware such as a processor including local memory. The local memory can store instructions used by the processor to execute storage array operations. The HA 21 can manage communications and data operations between one or more host systems 14a-n and the global memory (GM) 25b. In an embodiment, the HA 21 can be a Fibre Channel Adapter (FA) or another adapter which enables host 14a-n to communicate with the array 12. A front-end of the data storage array 12 can include the HA 21. The RA 40 can enable communications between data storage arrays (e.g., between the storage array 12 and the external system(s)). The storage array 12 can also include one or more device interfaces 23 that enable data transfers to/from the data storage disks 16a-n. The device interfaces 23 can include device interface modules, for example, one or more disk adapters (DAs) 30 (e.g., disk controllers), flash drive interface 35, and the like. The DA 30 can be in a backend part of the data storage array 12. The backend part of the array 12 can enable data transfers to/from the physical data storage disks 16a-n.

One or more internal logical communication paths can exist between the device interfaces 23, the RAs 40, the HAs 21, and the memory 26. An embodiment, for example, can use one or more internal busses and/or communication modules. The memory 26 can include global memory 25b that enables data transfers and other communications between the device interfaces 23, HA 21 and/or RA 40. In an embodiment, the device interfaces 23 can perform data operations using a cache (not shown) of the global memory 25b. The memory 26 can include memory portion 25a that configured for customized use based on specific requirements of a business.

The data storage system 10 as described in this embodiment, or a device thereof, such as a disk or aspects of a flash device, should not be construed as a limitation. Other types of commercially available data storage systems, as well as processors and hardware controlling access to these devices, can also be included in an embodiment.

Host systems 14a-n supply data and access control information through channels (e.g., medium 18) to the storage array 12. The storage array 12 can also supply data to the host systems 14a-n also through the channels. The host systems 14a-n do not address the drives or disks 16a-n of the storage systems directly, but access data from a plurality of logical devices or logical volumes (LVs) set up by the array 12. The LVs do not need to correspond to the actual physical devices or drives 16a-n. For example, one or more LVs can exist on a single physical drive or multiple drives. Hosts 14a-n can access data from the array 12 stored by disks 16a-n via HA 21. The RA 40 can enable communications between two or more data storage arrays. The DA 30 can be one type of device interface that enables data transfers to/from the disk drive(s) 16a-n and their corresponding LV(s). A flash device interface 35 is a device interface that can transfer data to/from flash devices and LV(s).

A system analyzer 22 can dynamically monitor the storage array 12 to collect a wide array of data (e.g. storage system telemetry data), both real-time/current and historical. The system analyzer 22 can also receive similar data from an external monitoring system. The analyzer 22 can also receive data from the power grid monitor 105, e.g., via communication medium 18. In embodiments, the analyzer 22 can collect data from the storage array 12 and its components 110 via one or more daemons. A daemon can couple to one or more array components 110 and log each component's activity. The components 110 can be any of the elements 16a-n, 21-23, 25a-b, 26, 30, 35, and 40, amongst other known storage system components. The collected data can be real-time and/or historical storage system telemetry data. Additionally, the analyzer 22 can receive data from the power grid monitor 105. In embodiments, the data can include information related to power levels of a power grid that is supplying power to the array 12.

In embodiments, the power grid monitor 105 can communicate with the data storage array 12 and hosts 14a-n through one or more connections such as a serial port, a parallel port, and a network interface card, for example, with an Ethernet connection. Using the Ethernet connection, for example, a device processor can communicate directly with DA 30, HA 21, and/or RA 40 of the data storage array 12. In other embodiments, the power grid monitor 105 can be implemented via a cloud-based hosted solution (e.g., remote server) that communicates with the array 12 and/or the grid monitor 105 via a network 18 (e.g., Internet, local area network (LAN), wide area network (WAN), and storage area network (SAN), amongst others).

In embodiments, the analyzer 22 can perform one or more data protection operations in preparation for and in response to a power disruption. The data protection operations can include switching the array 12 to a backup power supply. The operations can also include controlling power consumption of one or more storage array components based on the data collected from the logs of each daemon and an amount of power available in the backup power supply. For example, the analyzer 22 can perform one or more power shedding techniques as described in greater detail in the following paragraphs.

Figure 2:
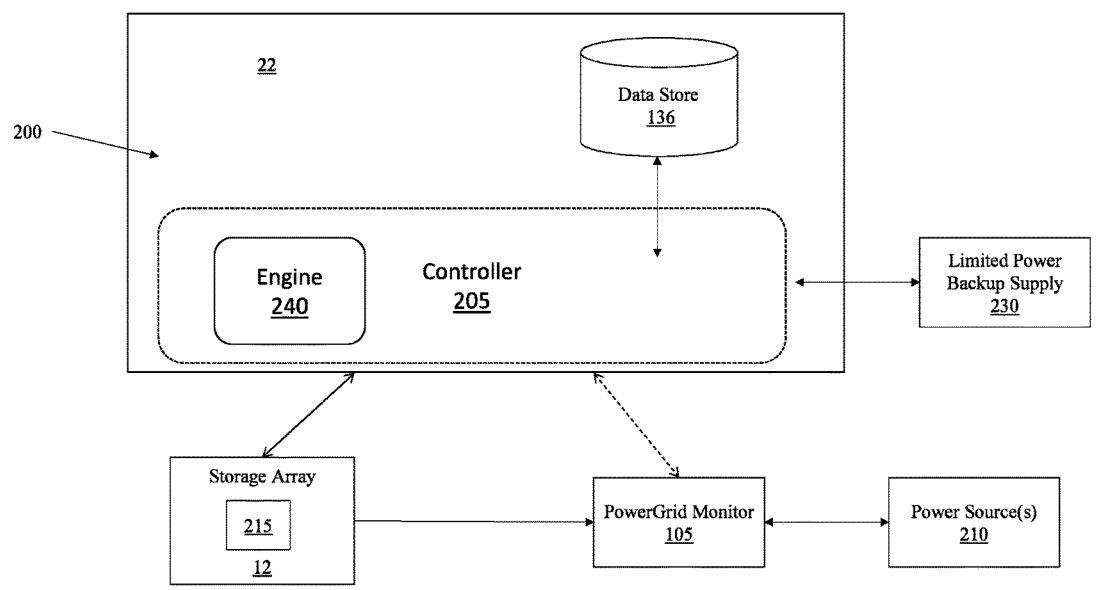
FIG. 2 is a block diagram of a system analyzer in accordance with example embodiments disclosed herein.

Referring to FIG. 2, a power grid analyzer 22 can perform one or more data protection operations in preparation for and in response to a disruption of continuous power to a storage array 12 from a continuous power source(s). In embodiments, the analyzer 22 can include one or more hardware and/or software elements 200 (e.g., controller 205 and data store 136) configured to perform certain data protection operations.

The analyzer 22 can be communicatively coupled to the array 12 and its components 110 via a communicative primitive such as Fibre Channels and NVMe (Non-Volatile Memory Express) communication interfaces. The analyzer 22 can receive storage system telemetry data of the storage array 12 and its components 110. In embodiments, one or more daemons 210 can be communicatively coupled to the storage array 12 and its components 110. The daemons 210 can monitor and collect telemetry data of the array 12 and its components 110. In examples, the daemons 210 can generate searchable data structures (e.g., activity logs) that store and organize the telemetry data in a searchable format. Accordingly, the analyzer 22 can obtain the telemetry data using any known push or pull (e.g., fetch) data retrieval techniques.

Additionally, the analyzer 22 can receive power data from a power grid monitor 105. In embodiments, the data can include information related to power levels and fluctuations of a power source 210 that is supplying continuous power to the array 12. The monitor 105 can use any known voltage and/or current measurement techniques to determine power levels and fluctuations. Further, the analyzer 22 can be communicatively coupled to a limited power back supply 230. The analyzer 22 can obtain backup power metrics (e.g., power levels, total power supply, current power supply, amongst other related back power supply metrics).

In embodiments, the controller 205 can determine a priority of each component 110 based on the collected telemetry data. For example, the controller 205 can process real-time and/or historical telemetry data to anticipate workloads and their compositions during any moment in time. A workload composition can correspond to a type, size, and service level, among other relevant workload parameters of each I/O operation and/or request in the workload. Based on both the historical and anticipated workloads, the controller 205 can determine priority levels of I/O operations in each workload. Further, the controller 205 can determine the array's components 110 used to process each I/O operation. Accordingly, the controller 205 can also determine which components 110 are processing I/O operations having high SLs at any time. Additionally, the controller 205 can determine total processing times, power requirements, and time to lower an energy state for each of the components 110. Further, the controller 205 can correlate the information generated from the telemetry data to in a power scheduling data structure to identify a priority of each of the components 110.

In embodiments, a backup power supply can only have a limited power supply. Thus, the backup power supply may not have enough power (e.g., capacity) to drive the operations of each of the components 110 to completion in response to a disruption of a continuous power supply (e.g., power source 210). Accordingly, the controller 205 can control the power supply to each of the components 110 using a priority-based selection of the components 110. For example, the controller 205 can bring array components 110 to a lower or zero (0) energy state to conserve power of the limited backup power supply (e.g., a battery backup).

In embodiments, the components 110 can include processors (e.g., CPUs), drives (e.g., used and unused), park cores, fabric interfaces, host interfaces, clock memory, cooling fans, backend interfaces, and frontend interfaces, amongst other relevant storage array components.

In addition, the controller 205 can control the operations of each of the components 110 to ensure they use less power during a power supply disruption. For example, the controller 205 can control speeds and functions, amongst other operational factors of the components 110 such as by adjusting CPU frequencies, memory clock speeds, cooling fan rotational speeds, and drive of backend interfaces, amongst others.

In embodiments, the controller 205 can use the power scheduling data structure to generate one or more power shedding models. Each of the models can correspond to one or more current and/or anticipated I/O workloads. Each model can include a schedule for bringing each of the array components to a lower or zero energy state to converse the power supply of, e.g., the battery backup. The schedule can order the timing to lower each component's energy state based on their respective priority levels. Further, the schedule can correlate each of the components 110 to their respective priority levels and time required to lower their energy states. As described in greater detail above, the priority levels of the components 110 can be determined based on an analysis of current and/or historical telemetry data of the components 110.

In embodiments, the controller 205 can determine each of the components 110 a priority levels (e.g., $P_1$-$P_N$) using one or more of the power shedding models. Using the power shedding models, the controller 205 can identify the priority levels of each component based the respective importance of each component's quality of work/service during a power disruption event. Further, the controller 205 can use the models to determine times ($T_1$-$T_N$) required to bring the components 110 to a lower or zero (0) energy state in a serial and/or parallel manner.

Using the determined priority levels ($P_1$-$P_N$) and times ($T_1$-$T_N$), the controller 205 can employ an optimization technique to generate a power shedding schedule. The optimization technique can determine an order and timing for bringing components 110 to lower or zero energy states that ensures critical data and/or I/O operations are vaulted, maximizes use of the battery backup, and minimizes vaulting time, amongst other data protection operations.

In embodiments, the controller 205 can include an optimization engine 240 that performs one or more optimization techniques. For example, the engine 240 can include binary integer logic that generates the power shedding schedule to ensure critical data and/or I/O operations are vaulted, maximize use of the battery backup, minimize vaulting time, and perform other data protection operations before the battery backup power supply is exhausted. In embodiments, the binary integer logic can be configured to prioritize active components 110 and ensure their operations remain within power reserve constraints. Further, the logic can be configured to minimize a completion time of vaulting operations. In some examples, the logic can generate the power shedding schedule to bring energy states of components to a lower or zero energy state in a serial and/or parallel manner.

Figure 3:
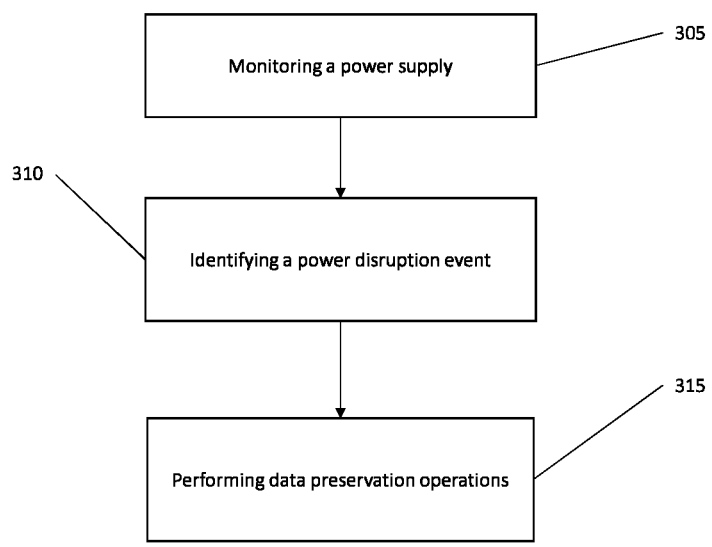
FIG. 3 is a flow diagram of a method for preserving data in accordance with example embodiments disclosed herein.
Figure 4:
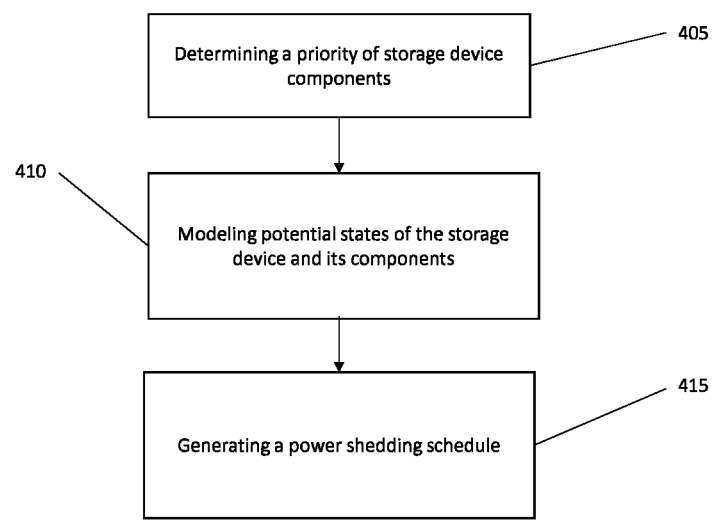
FIG. 4 is a flow diagram of a method for controlling power supply for storage device operations in accordance with example embodiments disclosed herein.

FIGS. 3-4 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts can be required to implement the methods in accordance with the disclosed subject matter.

Referring to FIG. 3, a method 300 can be performed by, e.g., analyzer 22 of FIG. 1. The method 300, at 305, can include monitoring a power supply. The method 300, at 310, can also include identifying a power disruption event. At 315, the method 300 can further include performing one or more data preservation operations.

A skilled artisan understands that the method 400 and any of its steps can be performed using any technique described herein.

Regarding FIG. 4, a method 400 can be performed by, e.g., analyzer 22 of FIG. 1. The method 400, at 405, can include determining a priority of each storage array component. At 410, the method 400 can include modeling potential states of the storage array 12 of FIG. 1 and its components. The method 400, at 415, can further include generating a power shedding schedule.

A skilled artisan understands that the method 500 and any of its steps can be performed using any technique described herein.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and any combination of the listed parts.

One skilled in the art will realize the concepts described herein can be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. An apparatus comprising at least one processor configured to:
   monitor a power supply from a continuous power source for a storage device;
   identify a power disruption event interrupting the power supply from the continuous power source; and
   in response to detecting the event:
      switch to a backup power supply,
      control power consumption of one or more components of the storage device based on information associated with each component and an amount of power available in the backup power supply,
      perform one or more power interruption operations while the backup power supply includes enough power for performing the power interruption operations,
      control a power consumption of the one or more storage device components based on a priority-based schema, and
      generate the priority-based schema by:
         determining at least one or more of: a priority of each storage device component and a length of time required to bring each storage device component from the first energy state to the lower second energy state, and
         modeling possible states of each component and the storage device during the power disruption event.

2. The apparatus of claim 1 further configured to determine the state of the storage device contemporaneous to the power disruption event.

3. The apparatus of claim 1 further configured to determine a state of the one or more storage device components contemporaneous to the event.

4. The apparatus of claim 1 further configured to determine the priority of each storage device component based on at least a quality of work and/or service provided by each component.

5. The apparatus of claim 3 further configured to control the power consumption of each storage device component by bringing each storage device component from a first energy state to a lower second energy state.

6. The apparatus of claim 4 further configured to determine a length of time required to perform one or more power reserve operations based on the state of each component and the storage device during the power disruption event.

7. The apparatus of claim 6 further configured to generate a power shedding schedule based on one or more of the priorities of each storage device component and the determined length of time to perform the one or more power reserve operations, amongst other power reserve parameters.

8. The apparatus of claim 7 further configured to control the power consumption of each storage device component based on the priority-based schema and the power shedding schedule.

9. A method comprising:
   monitoring a power supply from a continuous power source for a storage device;
   identifying a power disruption event interrupting the power supply from the continuous power source; and
   in response to detecting the event:
      switching to a backup power supply,
      controlling power consumption of one or more components of the storage device based on information associated with each component and an amount of power available in the backup power supply,
      performing one or more power interruption operations while the backup power supply includes enough power for performing the power interruption operations,
      controlling a power consumption of the one or more storage device components based on a priority-based schema, and generating the priority-based schema by:
  determining at least one or more of: a priority of each storage device component and a length of time required to bring each storage device component from the first energy state to the lower second energy state, and
  modeling possible states of each component and the storage device during the power disruption event.

10. The method of claim 9 further comprising determining the state of the storage device contemporaneous to the power disruption event.

11. The method of claim 9 further comprising determining a state of the one or more storage device components contemporaneous to the event.

12. The method of claim 9 further comprising determining the priority of each storage device component based on at least a quality of work and/or service provided by each component.

13. The method of claim 11 further comprising controlling the power consumption of each storage device component by bringing each storage device component from a first energy state to a lower second energy state.

14. The method of claim 12 further comprising determining a length of time required to performing one or more power reserve operations based on the state of each component and the storage device during the power disruption event.

15. The method of claim 14 further comprising generating a power shedding schedule based on one or more of the priorities of each storage device component and the determined length of time to performing the one or more power reserve operations, amongst other power reserve parameters.

16. The method of claim 15 further comprising controlling the power consumption of each storage device component based on the priority-based schema and the power shedding schedule.

* * * * *